United States Patent
Sumi et al.

(10) Patent No.: US 8,823,292 B2
(45) Date of Patent: Sep. 2, 2014

(54) ELECTRIC COMPRESSOR

(75) Inventors: Tomoyuki Sumi, Kariya (JP); Hiroshi Amano, Nishio (JP)

(73) Assignee: DENSO CORPORATION, Kariya (JP)

( * ) Notice: Subject to any disclaimer, the term of this patent is extended or adjusted under 35 U.S.C. 154(b) by 304 days.

(21) Appl. No.: 13/397,889

(22) Filed: Feb. 16, 2012

(65) Prior Publication Data

US 2012/0213649 A1 Aug. 23, 2012

(30) Foreign Application Priority Data

Feb. 18, 2011 (JP) ................................. 2011-032959

(51) Int. Cl.
*H02P 1/54* (2006.01)
*H02P 5/74* (2006.01)

(52) U.S. Cl.
CPC ....................................... *H02P 5/74* (2013.01)
USPC ................... 318/34; 318/35; 318/37; 318/38; 318/39

(58) Field of Classification Search
CPC ........................................................ H02P 5/74
USPC ........................................ 318/34, 35, 37–39
See application file for complete search history.

(56) References Cited

U.S. PATENT DOCUMENTS

| | | | | |
|---|---|---|---|---|
| 6,654,648 B2 * | 11/2003 | Nada et al. | ....................... | 700/19 |
| 2011/0129368 A1 * | 6/2011 | Smith | ......................... | 417/410.1 |

FOREIGN PATENT DOCUMENTS

| | | |
|---|---|---|
| JP | H04-261393 A | 9/1992 |
| JP | H06-335260 A | 12/1994 |
| JP | A-2000-318435 | 11/2000 |
| JP | 2002-332909 A | 11/2002 |
| JP | 2003-079176 A | 3/2003 |
| JP | B2-4151439 | 7/2008 |
| JP | 2008-199761 A | 8/2008 |

OTHER PUBLICATIONS

Office Action mailed by the Japanese Patent Office on Mar. 4, 2014 in corresponding Japanese Patent Application No. 2011-032959 (and English translation).

* cited by examiner

*Primary Examiner* — David Luo
(74) *Attorney, Agent, or Firm* — Posz Law Group, PLC

(57) ABSTRACT

An electric compressor, wherein an inverter device, which controls the operation of an electric motor by commands from an external control unit, is provided with a drive IC which computes drive signals of the electric motor based on the same, a switching circuit which converts the drive signals to rotation control signals of the electric motor, and an output signal control IC which cuts off input of the drive signals to the switching circuit at the time of an abnormality and wherein, furthermore, the drive IC is provided with a comparator which compares drive signals which are input to the switching circuit and computed values of the drive signals at a control unit inside the drive IC and, when the drive signals and the computed values do not match, the comparator makes the output signal control IC cut off input of the drive signals to the switching circuit.

20 Claims, 12 Drawing Sheets

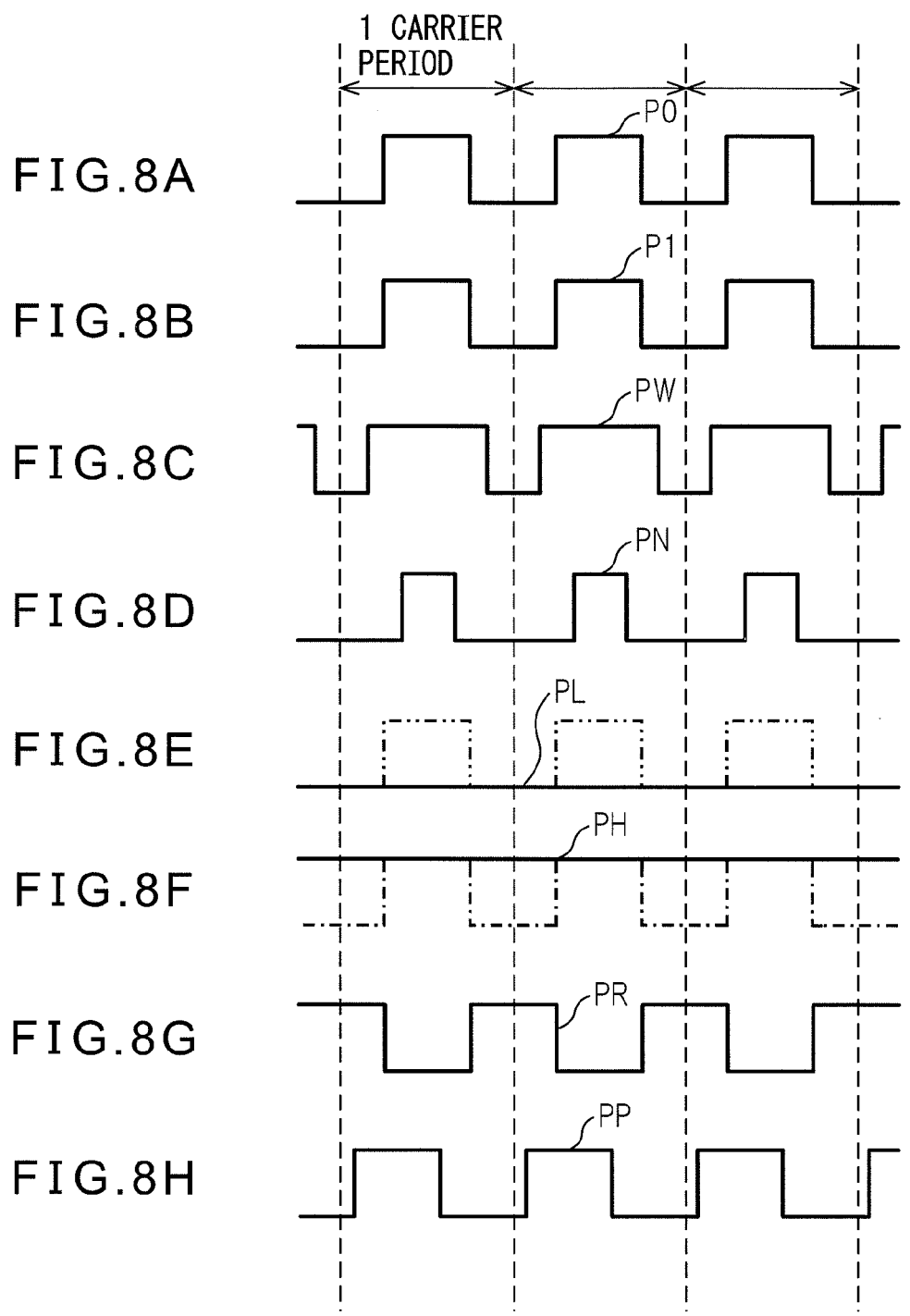

ELECTRIC COMPRESSOR

BACKGROUND OF THE INVENTION

1. Field of the Invention

The present invention relates to an electric compressor and is suitable for enabling efficient operation of an electric compressor for a vehicular air-conditioner at the time of cold startup of the vehicle.

2. Description of the Related Art

Conventionally, vehicles, houses, etc. have been provided with air-conditioners for suitably adjusting cabin or room temperature. An air-conditioner is provided with a refrigeration cycle comprised of a compressor, a condenser, an expansion valve, and an evaporator. The compressor compresses a gaseous refrigerant to obtain a high temperature, high pressure gas, while the condenser robs heat from the high temperature, high pressure gas to convert it to a low temperature, high pressure liquid. Further, the expansion valve converts the low temperature, high pressure liquid to a low temperature, low pressure liquid, while the evaporator causes the low temperature, low pressure liquid to vaporize so as to cool the surroundings. The compressor is generally an electric compressor which is driven by an electric motor. The rotational speed of the electric motor is determined by an inverter device which is controlled by an electronic control unit.

The electronic control unit uses startup/stopping information of the electric compressor which is input from the outside and operating information on what speed to make the electric motor operate as the basis to compute a control signals for the inverter device. The electronic control unit sends the computed control information to the inverter device to control the speed of the electric motor. Such control of the speed of an electric compressor (electric motor) using an inverter device is disclosed in Japanese Patent Publication (A) No. 2000-318435. Further, an electronic control unit which inputs stopping information of the electric compressor to the inverter device wherein this stopping information is made to bypass an electronic control means inside the inverter device and be transmitted to a drive circuit of the electric motor is described in Japanese Patent No. 4151439.

FIG. 1 shows an example of the general configuration of an electric compressor 100 which operates by control signals (commands) from an electronic control unit 5 which is provided outside the electric compressor 100 (hereinafter referred to as the "external ECU") 5. The electric compressor 100 is comprised of a compressor 3, an electric motor 2, and an inverter device 1. The compressor 3 compresses a gaseous refrigerant to a high temperature, high pressure gas, while the electric motor 2 drives the compressor 3. Further, the inverter device 1 controls the speed of the electric motor 2. The electric motor 2 is usually a 3-phase AC motor. The inverter device 1 is supplied with power from a power supply unit 4 at the outside. When the electric compressor 100 is mounted in a vehicle, the power of the power supply unit 4 comes from a battery 8. Power from the battery 8 is supplied to the inverter device 1 through switches 6 and 7 which are turned on when a not shown ignition switch is turned on.

Inside the inverter device 1, there are an input filter 10, a switching circuit 20, a drive IC 30, and an output signal control IC 40. The switching circuit 20 converts direct current from the power supply unit 4 to a three-phase alternating current. The drive IC 30 controls the operation of the electric motor 2. The output signal control IC 40 is connected to the drive IC 30 by first signal transmission circuits 21 and permits or cuts off output of the drive signals from the drive IC 30. The input filter 10 has a coil 11 and a capacitor (usually an electrolytic capacitor) 12. The switching circuit 20 is provided with a bridge circuit which is comprised of six thyristors, transistors, or other switching devices. Further, the drive IC 30 has a control unit 31 and a ROM/RAM check unit 33 which checks the ROM/RAM region 33. The output signal control IC 40 has an output permission/cutoff control unit 41 which is provided with six on/off switches 42. The output signal control IC 40 and the switching circuit 20 are connected by second signal transmission circuits 22. Further, the output circuits 24 from the switching circuit 20 to the electric motor 2 are provided with a current sensor 34 which detects the drive current. The detected drive current of the electric motor 2 is input to the control unit 31 of the drive IC 30.

The inverter device 1 configured in the above way receives commands from the external ECU 5, uses the control unit 31 to calculate the drive signals of the switching devices inside of the switching circuit 20, and turns the switching devices on and off to drive the electric motor 2. Further, it feeds back the motor current which was detected by the current sensor 34 to the control unit 31 to detect over current. If a motor current which exceeds a threshold value is flowing, the external ECU 5 immediately stops the drive operation of the electric motor 2 to protect the switching devices to prevent malfunctions.

The coil 11 and the capacitor 12 which form the input filter 10 which is provided at the input part of the switching circuit 20 cause the inflow of ripple current of the power supply which is input from the power supply unit 4 to attenuate to thereby smooth the power. Furthermore, the control unit 31 monitors for malfunctions of the ROM/RAM region 33 at all timings and returns the monitoring results to the external ECU. Further, to prevent runaway operation or malfunction of the drive IC 30 from causing the electric motor 3 to constantly consume power, the external ECU 5 directly inputs to the output signal control IC 40 a signal instructing permission/cutoff of output so as to control the on/off switches 42 and monitors the driven/stopped state of the electric motor 2.

However, in the inverter device 1 configured in this way, the external ECU 5 is depended on to prevent runaway operation due to malfunction of the drive IC 30. There is therefore the problem that the inverter device 1 itself cannot be used to prevent runaway operation due to malfunction of the drive IC 30. Here, the case where an aluminum electrolytic capacitor is used for the capacitor 12 of the input filter 10 will be considered. In this case, if the drive IC 30 erroneously operates and applies drive signals larger than envisioned to the switching devices, an extremely large surge voltage which exceeds the withstand voltage may be applied to the capacitor 12 or switching devices resulting in malfunctions. This is because an aluminum electrolytic capacitor increases in equivalent series resistance value at a low temperature. For this reason, the external ECU 5 performs guard control so that the electric motor 2 is not driven at the time of a low temperature. In this regard, in a vehicular air-conditioner which drives an electric motor 2 for heating, if the electric motor 2 is not driven at the time of a low temperature, there is the problem that heating will not be possible and the passengers will become cold.

SUMMARY OF THE INVENTION

An object of the present invention is to provide an electric compressor which, even at the time of a low temperature, can check for malfunction of the drive IC 30 at the inverter device side and, when there is no abnormality in the inverter device, can drive the electric motor 2 to operate the air-conditioning system as much as possible for heating.

To solve this problem, a first aspect of the invention provides an electric compressor wherein an inverter device (1) which controls the operation of an electric motor (2) which operates a compressor (3) by commands from an external control unit (5) is provided with a drive circuit (30) which uses an arithmetic logic unit (31) to compute drive signals to the electric motor (2) from the commands, a switching circuit (20) which converts the drive signals to a rotation control signals of the electric motor (2), and a cutoff circuit (40) which cuts off input of the drive signals to the switching circuit (20) at the time of an abnormality, the electric compressor characterized in that the inverter device (1) is provided inside it with a logic error detector (35, or 36, 37, and 43) which detects a logic error of the computed results of the drive signals at the arithmetic logic unit (31) and in that the logic error detector (35, or 36, 37, and 43) outputs an output cutoff signal to the cutoff circuit (40) to cut off input of the drive signals to the switching circuit (20) when there is a logic error in the computed results of the drive signals at the arithmetic logic unit (31).

Due to this, when there is a logic error in the computed results of the drive signals, the drive signals are not input to the switching circuit and the electric motor does not operate, so the electric compressor will no longer be driven by mistaken signals at the time of an abnormality.

A second aspect of the invention provides the electric compressor of the first aspect of the invention characterized in that the logic error detector is a comparator (35) which is provided at the drive circuit (30) and compares the drive signals which are input to the switching circuit (20) and the computed values of the drive signals at the arithmetic logic unit (31) inside of the drive circuit (30) and in that the comparator (35) outputs an output cutoff signal to the cutoff circuit (40) so as to cut off the input of the drive signals to the switching circuit (20) when the drive signals and the computed values do not match.

Due to this, when the computed values of the drive signals which were computed by the arithmetic logic unit and the drive signals which are input to the switching circuit do not match, the drive signals are not input to the switching circuit and the electric motor does not operate, so the electric compressor will no longer be driven by mistaken signals at the time of an abnormality.

A third aspect of the invention provides an electric compressor of the first aspect of the invention characterized in that the logic error detector is comprised of an error check unit (36) which outputs an error signal when there is an error in the arithmetic logic unit (31) in the drive circuit (30) and a monitoring pulse output unit (37) which makes the output of the monitoring pulse invert every predetermined time interval when the error signal is not input, both provided in the drive circuit (30), and an inversion detector (43) which is provided in the cutoff circuit (40) and which detects inversion of the monitoring pulse which is output from the monitoring pulse output unit (37) and in that the inversion detector (43) cuts off input of the drive signals from the cutoff circuit (40) to the switching circuit (20) when inversion of the monitoring pulse is not detected within a prescribed time.

Due to this, when there is an abnormality in the computing function of the arithmetic logic unit, the drive signals are not input to the switching circuit and the electric motor does not operate, so the electric compressor will not longer be driven by mistaken signals at the time of an abnormality.

A fourth aspect of the invention provides an electric compressor of the first aspect of the invention characterized in that the logic error detector is comprised of a comparator (35) which is provided in the drive circuit (30) and which compares the drive signals which are input to the switching circuit (20) and computed values of the drive signals at the arithmetic logic unit (31) in the drive circuit (30), an error check unit (36) which outputs an error signal when there is an error in the arithmetic logic unit (31) in the drive circuit (30) and a monitoring pulse output unit (37) which makes an output of the monitoring pulse invert every predetermined time interval when the error signal is not input, both of which are provided in the drive circuit (30), and an inversion detector (43) which is provided at the cutoff circuit (40) and which detects inversion of the monitoring pulse which is output from the monitoring pulse output unit (37), the comparator (35) outputs an output cutoff signal to the cutoff circuit (40) to cut off input of the drive signal to the switching circuit (20) when the drive signals and the computed values do not match, and the inversion detector (43) cuts off input of the drive signals from the cutoff circuit (40) to the switching circuit (20) when inversion of the monitoring pulse is not detected within a prescribed time.

Due to this, when the computed values of the drive signals which were computed by the arithmetic logic unit and the drive signals which are input to the switching circuit do not match and when there is an abnormality in the computing function of the arithmetic logic unit, the drive signals are not input to the switching circuit and the electric motor does not operate, so the electric compressor will not longer be driven by mistaken signals at the time of an abnormality.

A fifth aspect of the invention provides the second or fourth aspect of the invention characterized in that the comparator (35) outputs an output cutoff signal to the cutoff circuit (40) to cut off input of the drive signals to the switching circuit (20) at the time of startup of the electric compressor, compares the drive signals and the computed values in that state, and, when the drive signals and the computed values match, retracts the output cutoff signals.

Due to this, at the time of startup of the electric compressor, even if a low temperature, the electric compressor can be operated if the right conditions are met. When using the electric compressor for a vehicular air-conditioning system, heating is possible from a low temperature.

A sixth aspect of the invention provides the third or fourth aspect of the invention characterized in that the inversion detector (43) outputs a reset signal to the arithmetic logic unit (31) to reset the arithmetic logic unit (31) when cutting off input of the drive signals to the switching circuit (20).

Due to this, when there is an abnormality in the computing function of the arithmetic logic unit, the drive signals are not input to the switching circuit and the electric motor does not operate. Also, there is a possibility of recovery of the arithmetic logic function of the arithmetic logic unit by a reset signal.

A seventh aspect of the invention provides any of the second, fourth, and fifth aspects of the invention characterized in that the electric motor (2) is a three-phase AC motor, the drive signals are a U-phase top arm drive signal, U-phase bottom arm drive signal, V-phase top arm drive signal, V-phase bottom arm drive signal, W-phase top arm drive signal, and W-phase bottom arm drive signal and in that the comparator (35) outputs an output cutoff signal to the cutoff circuit (40) to cut off input of the drive signals to the switching circuit (20) when at least one drive signal among these drive signals does not match with a corresponding computed value.

Due to this, when there is an abnormality in one or more of the six drive signals of the three-phase AC motor, the three-phase AC motor is not driven to turn, so the safety is improved.

An eighth aspect of the invention provides any of the second, fourth, fifth, and seventh aspects of the invention characterized in that the compressor is provided with a phase shift unit (44) which shifts a phase of the drive signals to the cutoff circuit (40) and in that the comparator (35) outputs an output cutoff signal to the cutoff circuit (40) to cut off input of the drive signals to the switching circuit (20) when the drive signals after the phase shift and the computed values after phase shift of the computed values do not match.

Due to this, when the computed values of the drive signals which were computed by the arithmetic logic unit and which were shifted by the processing and the drive signals which are input to the switching circuit through the phase shift unit do not match, the drive signals are not input to the switching circuit and the electric motor does not operate, so the electric compressor will not longer be driven by mistaken signals at the time of an abnormality. Further, by employing a phase shift, the controllability of the electric compressor is improved.

A ninth aspect of the invention provides any of the third, fourth, and sixth aspects of the invention characterized in that the error check unit (36) compares commands which are input from the external control unit (5) and drive signals from the arithmetic logic unit (31) and outputs the error signal when there is a contradiction in the contents of the commands and the drive signals.

Due to this, when there is a problem in a communication path from the external control unit to the inverter device, the electric compressor will not operate, so it is possible to prevent erroneous operation of the electric compressor at the time of abnormality in the communication path from the external control unit to the inverter device.

A 10th aspect of the invention provides any of the first to ninth aspects of the invention characterized in that a power supply device which supplies power to the inverter device (1) is any one of a car battery or power supply device which supplies direct current obtained by rectification of a commercial power supply.

Due to this, either of a DC power supply unit and an AC power supply unit can be used for the power supply of the electric compressor, so the power supply of the electric compressor can be diversified.

An 11th aspect of the invention provides any of the second to 10th aspects of the invention characterized in that the electric compressor is an electric compressor which is mounted in a hybrid vehicle, the external control unit (5) is connected to a car battery, and the inverter device (1) is connected to a high voltage battery which is mounted in the hybrid vehicle.

Due to this, the electric compressor of the present invention can also be mounted in a hybrid vehicle.

Note that, the reference numerals in parentheses attached to the means are examples showing correspondence with specific means described in the later explained embodiments. The present invention may be more fully understood from the description of preferred embodiments of the invention, as set forth below, together with the accompanying drawings.

BRIEF DESCRIPTION OF THE DRAWINGS

These and other objects and features of the present invention will become clearer from the following description of the preferred embodiments given with reference to the attached drawings.

FIG. 8A is a waveform diagram of a pulse which shows computed results of top and bottom signals of UVW phases of an electric motor which are computed by the control unit of an inverter device of the present invention.

FIG. 8B is a waveform diagram of a signal which is input to an output permission/cutoff control unit when the control unit of an inverter device of the present invention is normal.

FIG. 8C is a waveform diagram of a signal which is input to an output permission/cutoff control unit when the control unit of an inverter device of the present invention is abnormal and wherein the pulse width of the input signal is broader than a normal width.

FIG. 8D is a waveform diagram of a signal which is input to an output permission/cutoff control unit when the control unit of an inverter device of the present invention is abnormal and wherein the pulse width of the input signal is narrower than the normal width.

FIG. 8E is a waveform diagram of a signal which is input to an output permission/cutoff control unit when the control unit of an inverter device of the present invention is abnormal and wherein the input signal is only a low level.

FIG. 8F is a waveform diagram of a signal which is input to an output permission/cutoff control unit when the control unit of an inverter device of the present invention is abnormal and wherein the input signal is only a high level.

FIG. 8G is a waveform diagram of a signal which is input to an output permission/cutoff control unit when the control unit of an inverter device of the present invention is abnormal and wherein the input signal is inverted.

FIG. 8H is a waveform diagram of a signal which is input to an output permission/cutoff control unit when the control unit of an inverter device of the present invention is abnormal and wherein the phase of the input signal is shifted.

DESCRIPTION OF THE PREFERRED EMBODIMENTS

Figure 1:
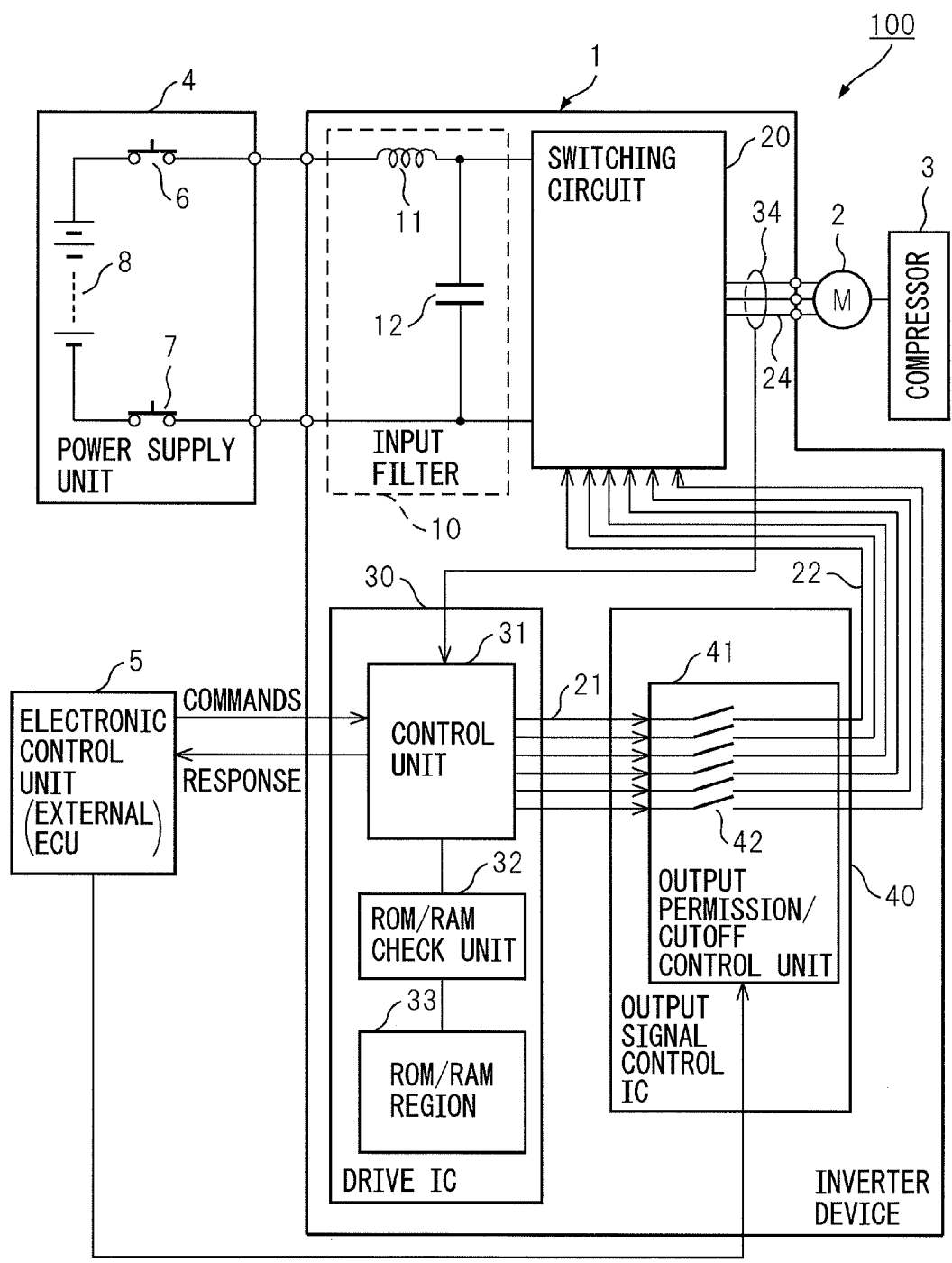
FIG. 1 is a block diagram of the configuration which shows a general example of the configuration of an electric compressor which operates by control signals from an electronic control unit.

While the invention has been described by reference to specific embodiments chosen for purposes of illustration, it should be apparent that numerous modifications could be made thereto by those skilled in the art without departing from the basic concept and scope of the invention.

Below, when the embodiments of the present invention are configured the same as the related art forming the basis of the present invention, the parts configured the same as the related art will be assigned the same reference numerals and explanations will be omitted. Further, parts configured the same among the embodiments will also be assigned the same reference numerals and explanations will be omitted or simplified.

Figure 2:
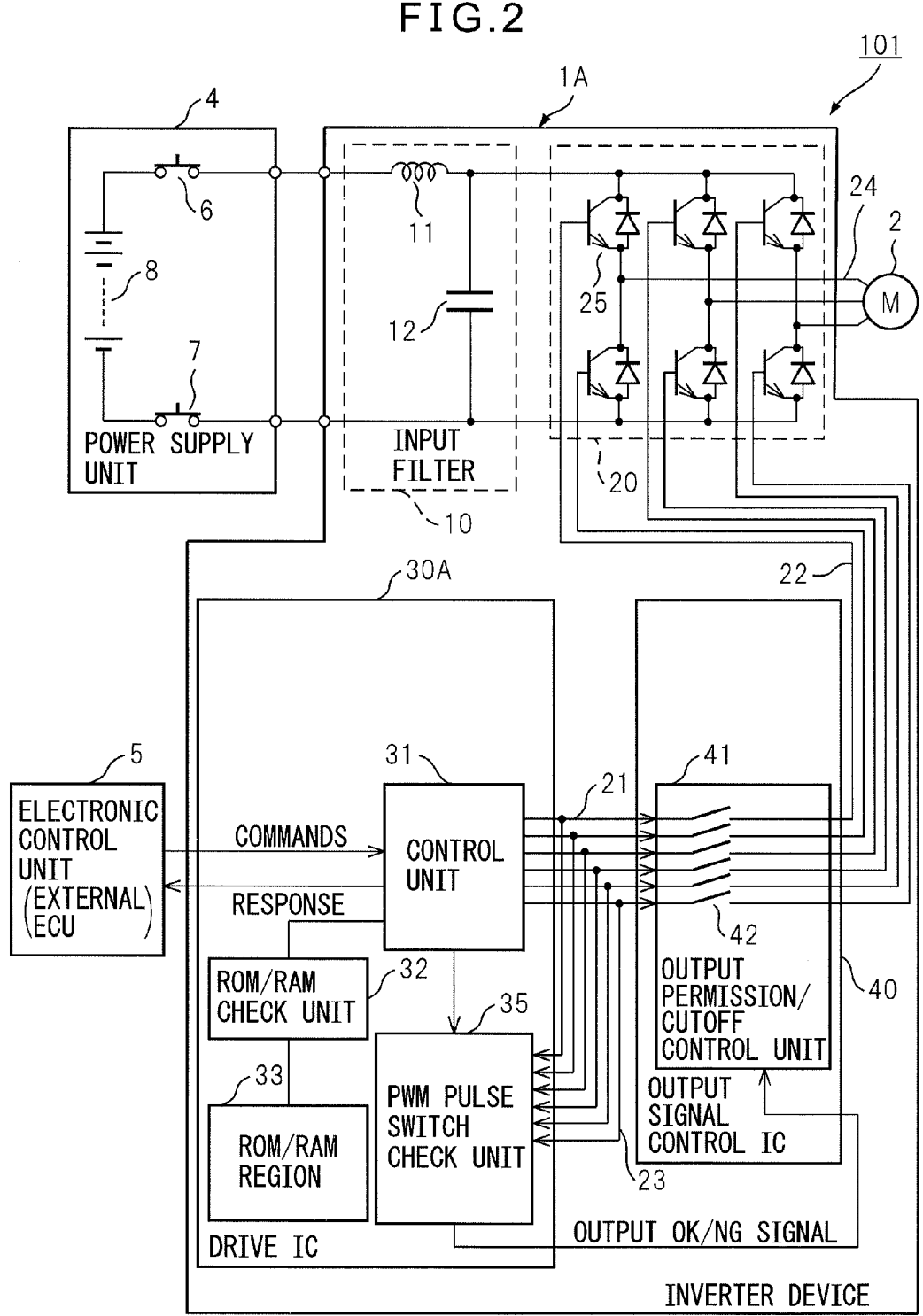
FIG. 2 is a block diagram of the configuration which shows a configuration of an electric compressor of a first embodiment of the present invention.

FIG. 2 shows the configuration of an electric compressor 101 of a first embodiment of the present invention which controls the rotation of an electric motor 2 by commands from an external control unit comprised of an external ECU 5. FIG. 2 omits the illustration of the compressor which is driven by the electric motor 2 which is shown in FIG. 1. Further, for the electric motor 2, a 3-phase AC motor is used. The point of difference of the electric compressor 101 of the first embodiment from the electric compressor 100 which is shown in FIG. 1 is the configuration of an inverter device 1A. The configuration of the power supply device which supplies the inverter device 1A with power, that is, the power supply unit 4, and the external ECU 5 are the same.

Inside of the inverter device 1A, there are an input filter 10, switching circuit 20, drive IC 30A, and output signal control IC 40. The switching circuit 20 is provided with six switching devices 25 and converts the direct current from the power supply unit 4 to a three-phase alternating current serving as rotation control signals of the electric motor. The drive IC 30A is a drive circuit which controls the rotation of the electric motor 2. Further, the output signal control IC 40 is connected to the drive IC 30A by first signal transmission circuits 21 and is a cutoff circuit which permits or cuts off output of the drive signal from the drive IC 30A. The output signal control IC 40 and the switching circuit 20 are connected by second signal transmission circuits 22.

Inside the drive IC 30A, in addition to the existing control unit 31, ROM/RAM region 33, and ROM/RAM check unit 33, a PWM pulse width check unit 35 is newly provided. Inside the output signal control IC 40, there is an output permission/cutoff control unit 41 which is provided with six on/off switches 42 in the same way. The first signal transmission circuit 21 and the second signal transmission circuit 22 are connected via the six on/off switches 42. The drive signals of the electric motor 2 which flow through the first signal transmission circuit 21 and the second signal transmission circuit 22 include, for example, a U-phase top arm drive signal, U-phase bottom arm drive signal, V-phase top arm drive signal, V-phase bottom arm drive signal, W-phase top arm drive signal, and W-phase bottom arm drive signal.

The PWM pulse width check unit 35 which is newly provided inside the drive IC 30A of the first embodiment is connected to a branching circuit 23 branched into six first signal transmission circuits 21. Therefore, the PWM pulse width check unit 35 receives as input the above-mentioned U-phase top arm drive signal, U-phase bottom arm drive signal, V-phase top arm drive signal, V-phase bottom arm drive signal, W-phase top arm drive signal, and W-phase bottom arm drive signal as actual drive signals of the electric motor 2. Further, the PWM pulse width check unit 35 receives as input the computed values of the drive signals of the electric motor 2 which were computed at the control unit 31.

Further, the PWM pulse width check unit 35 is a comparator which compares the computed values of drive signals of the electric motor 2 which are input from the control unit 31 and actual drive signals of the electric motor 2 which are input through the branching circuit 23 to the output permission/cutoff control unit 41. It is most reliable to compare the computed values and the actual drive signals for all of the above six drive signals, but any order of comparison is possible. Further, it is also possible to compare just one signal of each phase. The number of signals which are compared is not particularly limited.

If the PWM pulse width check unit 35 judges that the result of comparison of the computed values of the drive signals of the electric motor 2 which are input from the control unit 31 and actual input signals to the output permission/cutoff control unit 41 which are input through the branching circuit 23 is that of a match, the PWM pulse width check unit 35 sends the output permission/cutoff control unit 41 an output permission signal to set the six on/off switches 42 to the on state. As a result, the electric motor 2 makes the compressor operate. On the other hand, if the PWM pulse width check unit 35 judges that the above result of the comparison is not that of a match, the PWM pulse width check unit 35 sends the output permission/cutoff control unit 41 an output cutoff signal to set the six on/off switches 42 to the off state. As a result, the drive signals are not transmitted to the switching circuit 20 and the compressor is not driven by the electric motor 2.

FIGS. 8A to 8H explain the match/mismatch of the computed values of drive signals of the electric motor 2 and the actual input signals which are input through the branching circuit 23 to the output permission/cutoff control unit 41. The computed values of the top and bottom signals of the UVW phases of the electric motor 2 which are computed at the control unit 31 are shown by pulse waveforms. Consider the case where one is the pulse waveform P0 such as shown in, for example, FIG. 8A. The intervals which are shown by the broken lines show 1 carrier period. In this case, when the waveforms corresponding to the computed values of the actual input signals (control unit output signals) which are input through the branching circuit 23 to the output permission/cutoff control unit 41 are pulse waveforms P1 of the same pulse width, pulse period, and phase as shown in FIG. 8B, the computed values of the drive signals of the electric motor 2 and the actual input signals which are input through the branching circuits 23 to the output permission/cutoff control unit 41 match.

On the other hand, at the time of an abnormality where the pulse waveforms of the actual input signals which are input through the branching circuits 23 to the output permission/cutoff control unit 41 do not match the pulse waveforms corresponding to the above computed values, for example, the pulse waveforms of the actual input signals to the output permission/cutoff control unit 41, that is, the output signals of the control unit 31, are the pulse waveforms such as shown in FIG. 8C to FIG. 8H. FIG. 8C shows the case of a pulse waveform PW where the pulse widths of the input signals which are input to the output permission/cutoff control unit 41 are broader than the computed values, while FIG. 8D shows the case of a pulse waveform PN where the pulse widths of the input signals which are input to the output permission/cutoff control unit 41 are narrower than the computed values. Further, FIG. 8E shows the case where the input signals which are input to the output permission/cutoff control unit 41 are always a low level PL, while FIG. 8F shows the case where the input signals which are input to the output permission/cutoff control unit 41 are always at a high level PH. Furthermore, as shown in FIG. 8G, the case of the inverted signal PR where even if the pulse widths and the pulse periods are the same, the input signals which are input from the output permission/cutoff control unit 41 are inverted in output is a mismatch. Furthermore, as shown in FIG. 8H, the case of the pulse waveform PP where even if the pulse widths and the pulse periods are the same, the phases are different is also a mismatch.

Figure 3:
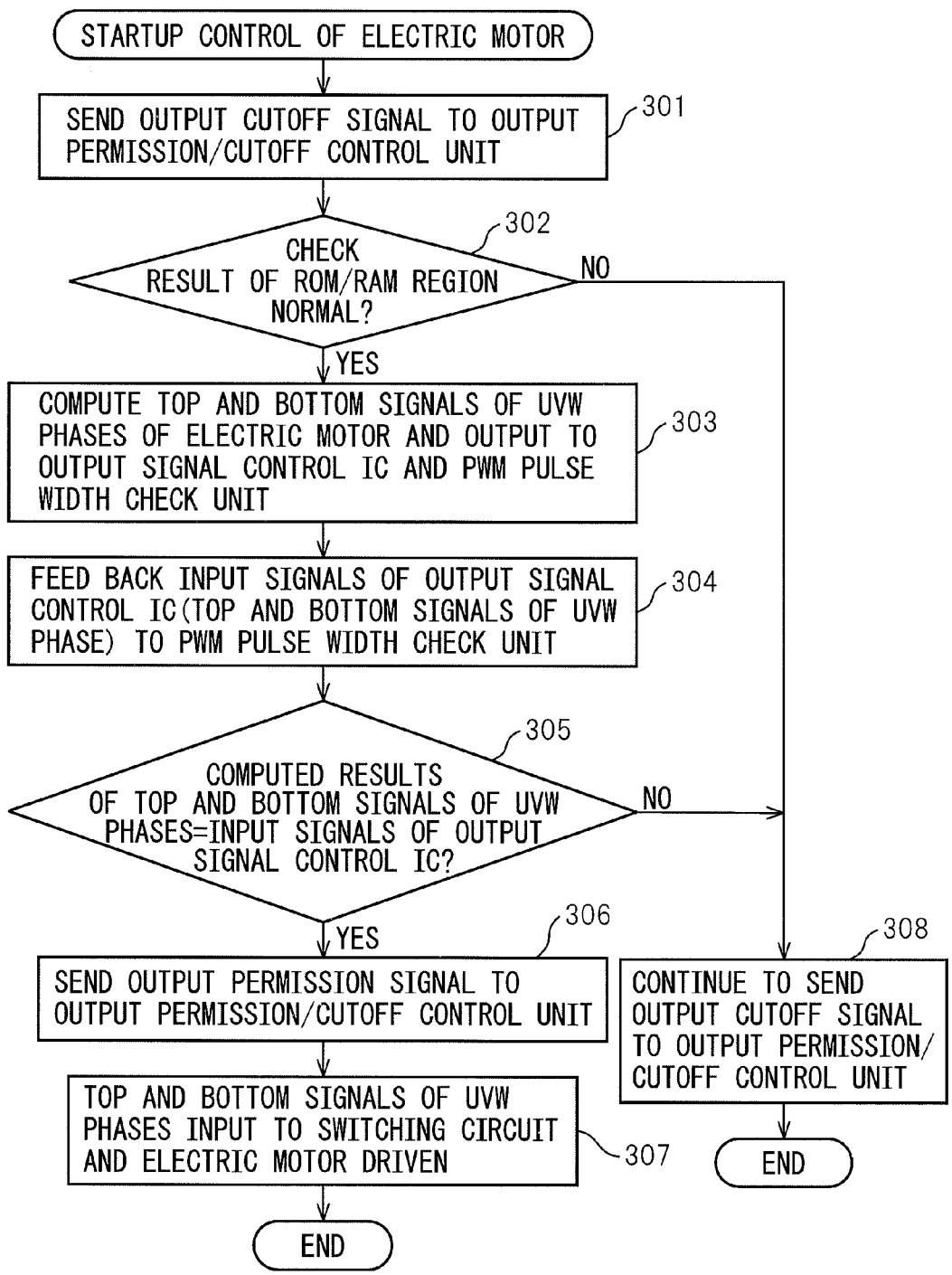
FIG. 3 is a flowchart which shows an example of a startup control routine of the electric compressor of a first embodiment of the present invention.

Here, one example of the control routine at the time of startup where the electric compressor 101 of the first embodiment which is configured as shown in FIG. 2 starts operating from the stopped state will be explained using the flowchart which is shown in FIG. 3. This control is performed every time the electric compressor 101 is started up.

At step 301, the PWM pulse width check unit 35 sends the output permission/cutoff control unit 41 an output cutoff signal to set the six on/off switches 42 to the off state and does not allow the electric motor 2 to operate. This is for confirming the state of the control unit 31 before making the electric motor 2 operate.

At the next step 302, the ROM/RAM check unit 32 of the drive IC judges if the check result of checking of the ROM/RAM region 33 is normal. If the check result is not normal, that is, at the time of an abnormality (NO), the routine proceeds to step 308 where PWM pulse width check unit 35 continuously sends the output permission/cutoff control unit 41 an output cutoff signal, then this routine is ended. In this case, since the ROM/RAM region 33 will sometimes recover from the abnormal state, the processing from step 301 may be performed again after a predetermined time.

When the judgment at step 302 is normal, the routine proceeds to step 303. At step 303, the control unit 31 computes the top and bottom signals of the UVW phases of the electric motor 2 and outputs the computed results through the first signal transmission circuits 21 to the output signal control IC 40 and outputs them to the PWM pulse width check unit 35. At the next step 304, the input signals of the output signal control IC 40 (top and bottom signals of the UVW phases of the electric motor 2 explained above) are input by the branching circuit 23 to the PWM pulse width check unit 35.

When in this way the computed results of the top and bottom signals of the UVW phases of the electric motor 2 and the input signals of the output signal control IC 40 are input to the PWM pulse width check unit 35, the PWM pulse width check unit 35 judges if the two are equal at step 305. When the two are not equal (NO), the routine proceeds to step 308 where the PWM pulse width check unit 35 continues to send the output permission/cutoff control unit 41 an output cutoff signal and this routine is ended. For this reason, if the computed results of the top and bottom signals of the UVW phases of the electric motor 2 and the input signals of the output signal control IC 40 differ, the electric motor 2 is not started up.

On the other hand, when the computed results of the top and bottom signals of the UVW phases of the electric motor 2 and the input signals of the output signal control IC 40 are equal, the routine proceeds to step 306. At step 306, the PWM pulse width check unit 35 sends the output permission/cutoff control unit 41 an output permission signal. When the output permission signal is input to the output signal control IC 41, the six on/off switches 42 are all on in state. As a result, as shown in the next step 307, the top and bottom signals of the UVW phases of the electric motor 2 are input to the switching circuit 20 and the electric motor 2 is driven so the compressor starts operating.

In this way, in the electric compressor 101 of the first embodiment, when, at the time of startup, the ROM/RAM region 33 is in the normal state and the computed results of the top and bottom signals of the UVW phases of the electric motor 2 and the input signals of the output signal control IC 40 are equal, the electric compressor 101 can be made to operate. For this reason, if the electric compressor 101 is mounted in a vehicle, when the air-conditioner is turned on at the time of cold start of the vehicle, up until now, due to judgment of the external ECU 5, the electric motor 2 was guarded against being driven, but in the electric compressor 101 of the first embodiment, even at a low temperature, when the ROM/RAM region 33 are in the normal state and the computed results of the top and bottom signals of the UVW phases of the electric motor 2 and the input signals of the output signal control IC 40 are equal, the electric compressor 101 can be operated and heating can be performed.

Figure 4:
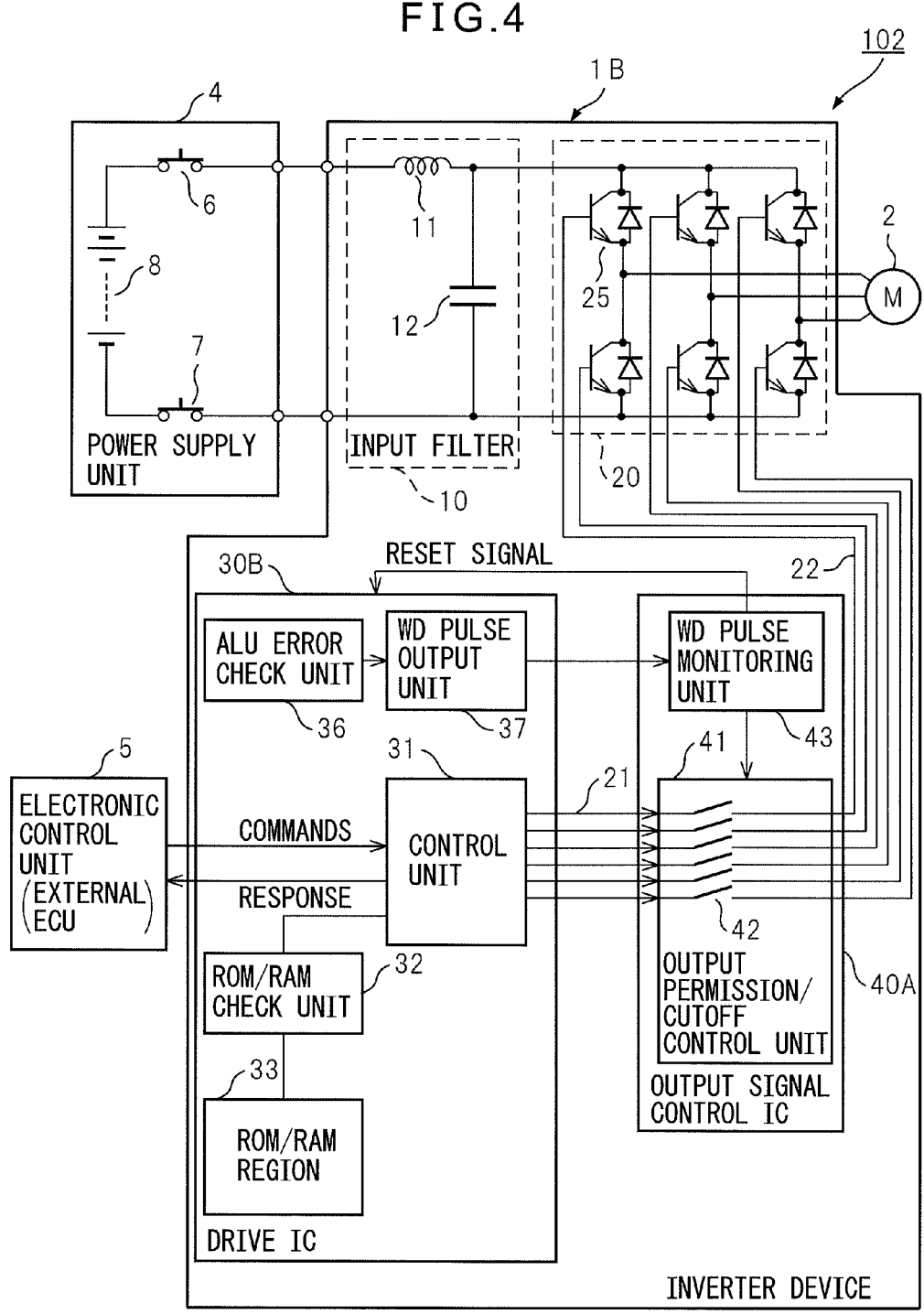
FIG. 4 is a block diagram of the configuration which shows the configuration of an electric compressor of a second embodiment of the present invention.

FIG. 4 shows the configuration of an electric compressor 102 of a second embodiment of the present invention which operates by commands from the external ECU 5. In FIG. 4 as well, illustration of the compressor which is driven by the electric motor 2 is omitted. Further, for the electric motor 2, a 3-phase AC motor is used. The electric compressor 102 of the second embodiment differs from the electric compressor 100 which is shown in FIG. 1 on the point of the configuration of the inverter device 1B. The configuration of the power supply unit 4 which supplies the inverter device 1B with power and the external ECU 5 are the same.

In the electric compressor 102 of the second embodiment, the drive IC 30B which is inside of the inverter device 1 is additionally provided with an ALU error check unit 36 and a WD pulse output unit 37, while the output signal control IC 40A is additionally provided with a WD pulse monitoring unit 43. Note that, "ALU error" is error of the arithmetic logic unit which forms the core of the computer. In this embodiment, it indicates error of the processing logic of the control unit 31. Further, the "WD pulse" is the monitoring pulse ("watch dog" pulse).

Figure 9A:
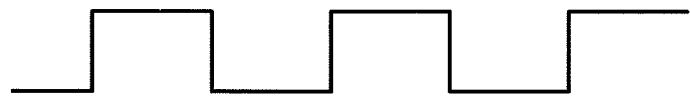
FIG. 9A is a waveform diagram of a normal pulse output which is output from the WD pulse output unit of the inverter device of the present invention.
Figure 9B:
FIG. 9B is a waveform diagram of an abnormal pulse output which is output from the WD pulse output unit of the inverter device of the present invention.

The ALU error check unit 36 monitors for any error in the processing logic of the control unit 31 of the drive IC 30B (arithmetic operations etc.) during operation of the inverter device 1B or the operations of any blocks in the drive IC 30B (bit shifts etc.) Further, the existence of any error in the processing logic of the control unit 31 is conveyed to the WD pulse output unit 37. Error of the processing logic of the control unit 31 of the drive IC 30B may be monitored by the ALU error check unit 36 constantly or every predetermined time interval. Further, when there is no error in the processing logic of the control unit 31, the WD pulse output unit 37, as shown in FIG. 9A, may make the output signal invert every other predetermined time interval. On the other hand, when there is error in the processing logic of the control unit 31, the ALU error check unit 36 inputs an error signal to the WD pulse output unit 37. The WD pulse output unit 37, as shown in FIG. 9B, does not make the output signal invert.

The WD pulse monitoring unit 43 in the output signal control IC 40A is an inversion detector which monitors the inverted state of the output signal from the WD pulse output unit 37. It does not subsequently operate when inversion is detected within a prescribed time. On the other hand, when inversion is not detected in the output signal from the WD pulse output unit 37 within the prescribed time, the WD pulse monitoring unit 43 sends the output permission/cutoff control unit 41 an output cutoff signal and turns all of the six on/off switches 42 off. As a result, the drive signals are not transmitted to the switching circuit 20, and the electric motor 2 does not cause the compressor to operate.

Furthermore, when inversion is not detected in the output signal from the WD pulse output unit 37 within a prescribed time, the WD pulse monitoring unit 43 sends a reset signal to the drive IC 30B to reset the drive IC 30B. This is because reset sometimes enable recovery of the arithmetic logic of the drive IC 30B. In addition to this, the check results of the ALU error check unit 36 are monitored by the external ECU 5 as an inverted state of the WD pulse, so there is high reliability against erroneous operation due to malfunctions of the drive IC.

Figure 5:
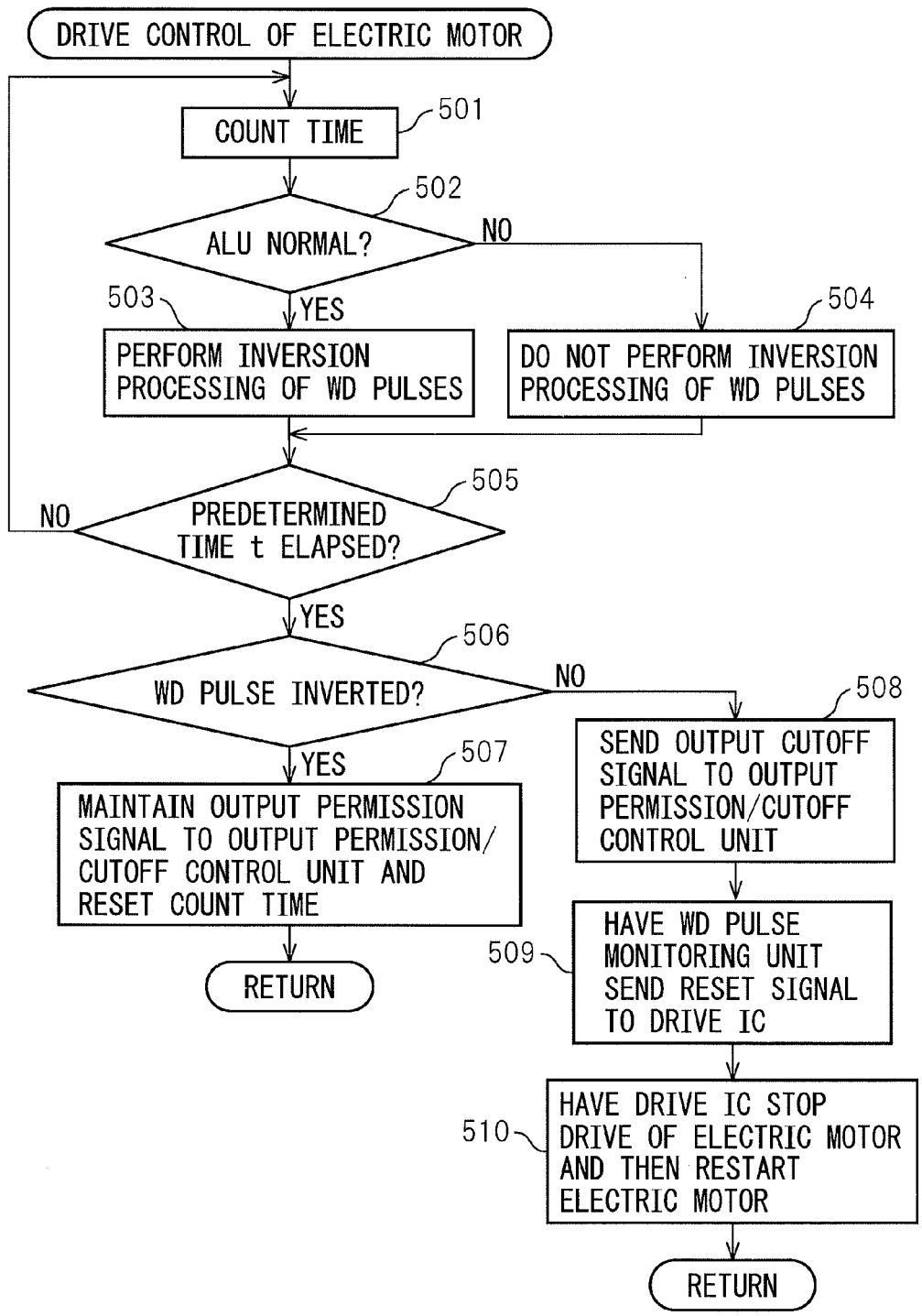
FIG. 5 is a flowchart which shows one example of control during operation of the electric compressor of a second embodiment of the present invention.

Here, one example of the control during operation of the electric compressor 102 of the second embodiment configured as shown in FIG. 4 will be explained using the flowchart which is shown in FIG. 5. This control is performed every predetermined time interval during operation of the electric compressor 102.

At step 501, the time is counted, then at the next step 502, it is judged if the processing logic of the control unit 31 (ALU) is normal. Further, if the ALU is normal (YES), the routine proceeds to step 503 where the WD pulse output unit 37 performs processing to invert the WD pulse and the routine proceeds to step 505. On the other hand, when the ALU is not normal (NO), the routine proceeds to step 504 where the WD pulse output unit 37 does not perform processing to invert the WD pulse and the routine proceeds to step 505.

At step 506, it is judged if a predetermined time has elapsed from when this routine was started. Further, when the predetermined time has not elapsed (NO), the routine returns to step 501 where the processing from step 501 to step 505 is repeated. On the other hand, when the predetermined time has elapsed, the routine proceeds to step 506 where whether the WD pulse has inverted is judged by the WD pulse monitoring unit 43. Even in the case of the time of an abnormality where the ALU is not normal, whether the WD pulse has inverted is not immediately confirmed by the WD pulse monitoring unit 43 because sometimes an ALU which is judged to be not normal due to the effects of noise etc. will return to normal along with the elapse of time.

If the judgment at step 506 confirms the inversion of the WD pulse (YES), the routine proceeds to step 507 where when an output permission signal is output to the output permission/cutoff control unit 41, the WD pulse monitoring unit 43 maintains this, the count time is reset, and this routine is ended. Further, when an output permission signal is not output to the output permission/cutoff control unit 41, only the count time is reset and the routine is ended.

On the other hand, if the judgment at step 506 does not confirm the inversion of the WD pulse (NO), the routine proceeds to step 508 where the WD pulse monitoring unit 43 sends an output cutoff signal to the output permission/cutoff control unit 41. As a result, all of the six on/off switches 42 turn off, and the drive signals are no longer transmitted to the switching circuit 20. At the next step 509, the WD pulse monitoring unit 43 sends a reset signal to the drive IC 30B and resets the drive IC 30B. The reset drive IC 30B temporarily stops the drive control of the electric motor at step 510, the electric motor 2 is restarted, and this routine is ended. At this time, the count time is also reset.

In this way, in the electric compressor 102 of the second embodiment, when an ALU error occurs during operation, the operation of the electric compressor 102 can be stopped and then the electric compressor 102 restarted. For this reason, it is possible to prevent in advance an abnormal state of the electric compressor 102 due to erroneous operation of the drive IC 30B.

Figure 6:
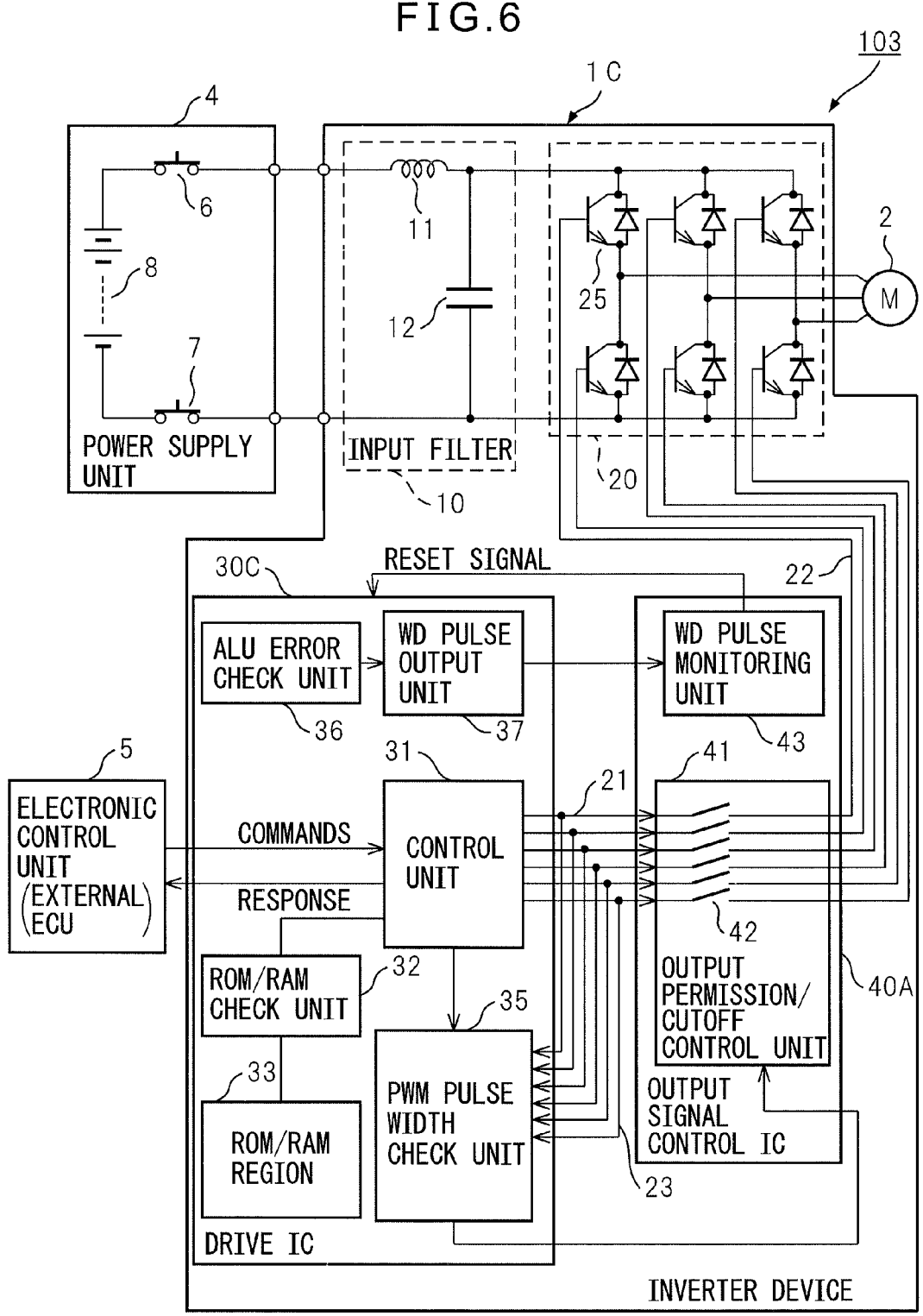
FIG. 6 is a block diagram of the configuration which shows the configuration of an electric compressor of a third embodiment of the present invention.

FIG. 6 shows the configuration of an electric compressor 103 of a third embodiment of the present invention which operates due to commands from the external ECU 5. In FIG. 6 as well, the illustration of the compressor which is driven by the electric motor 2 is omitted. The electric compressor 103 of the third embodiment is comprised of the electric compressor 101 of the first embodiment plus the ALU error check unit 36, WD pulse output unit 37, and WD pulse monitoring unit 43 in the electric compressor 102 of the second embodiment. Accordingly, the drive IC 30C of the third embodiment has a control unit 31, ROM/RAM check unit 32, ROM/RAM region 33, PWM pulse width check unit 35, ALU error check unit 36, and WD pulse output unit 37. Further, the configuration of the output signal control IC 40A is the same as the second embodiment.

Figure 7A:
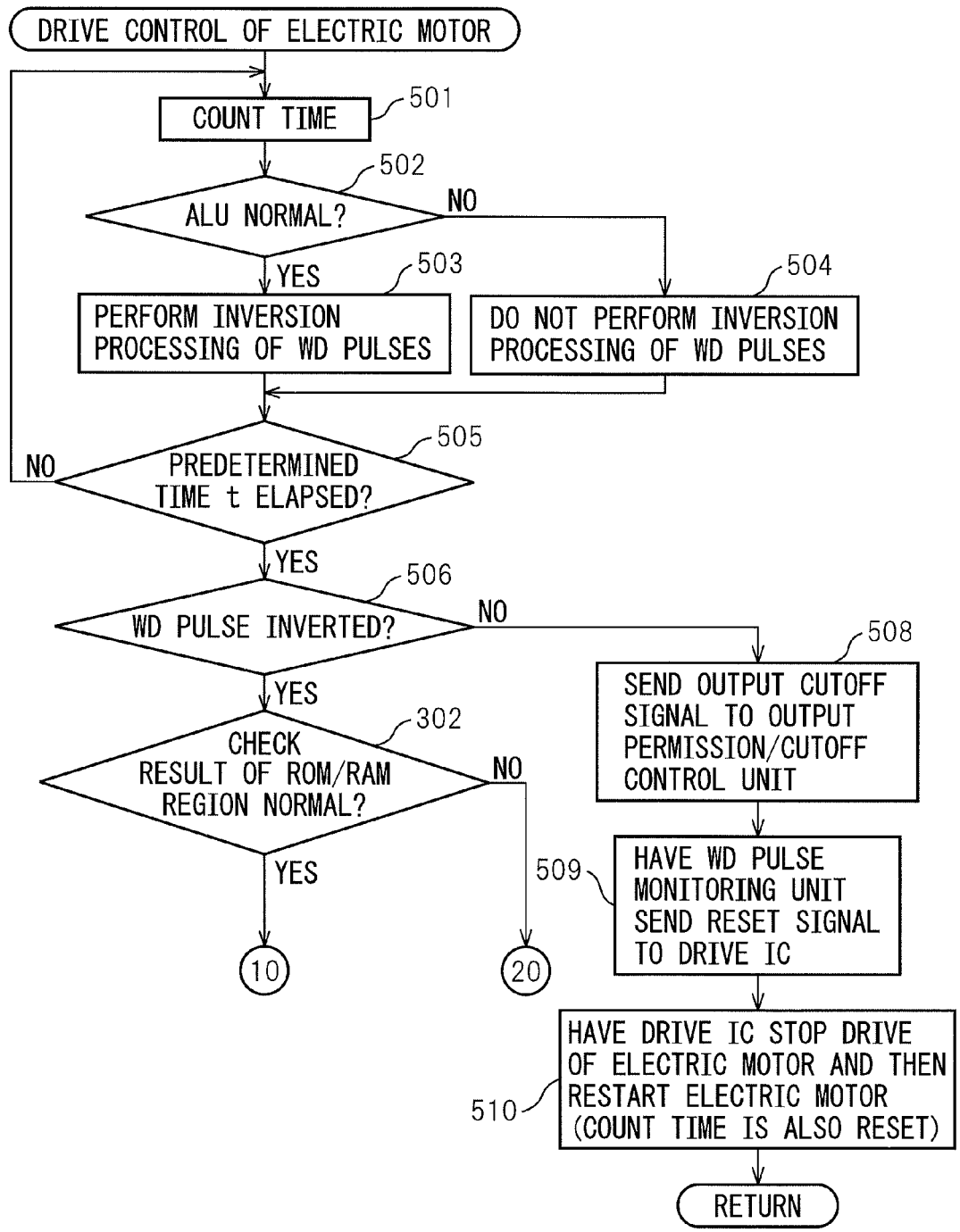
FIGS. 7A and 7B are flowcharts which show an example of control during operation of the electric compressor of a third embodiment of the present invention.
Figure 7B:
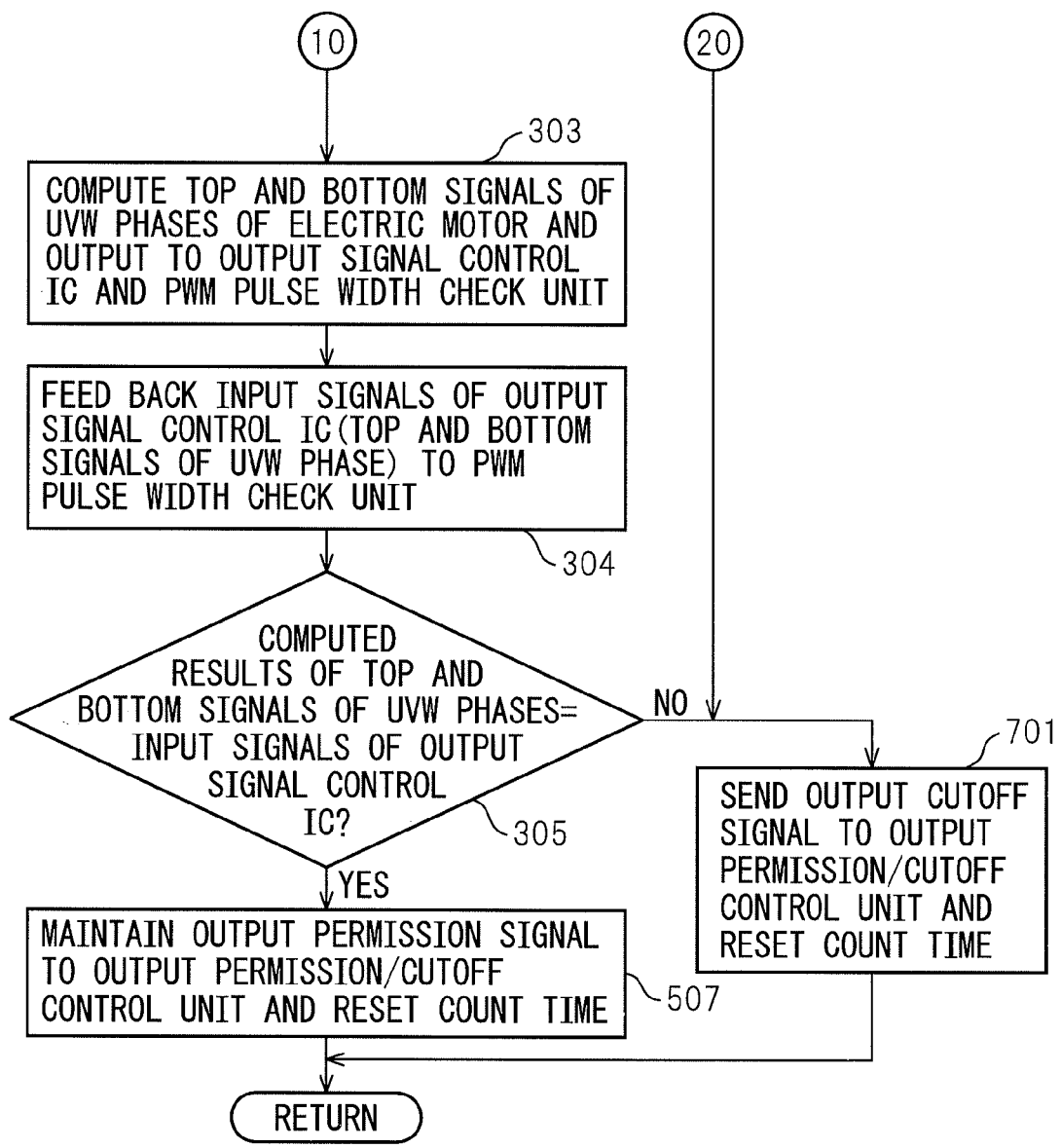

In the electric compressor 103 of the third embodiment configured as shown in FIG. 6, at the time of startup of the electric compressor 103, it is possible to perform the control which was explained at FIG. 3. Further, during operation of the electric compressor 103, it is possible to perform the control which was explained at FIG. 5. Furthermore, during operation of the electric compressor 103, in addition to the control which was explained at FIG. 5, it is possible to make the PWM pulse width check unit 35 compare the computed values of the drive signals of the electric motor 2 which are input from the control unit 31 and the actual input signals which were input through the branching circuits 23 to the output permission/cutoff control unit 41. This control will be explained using the flowchart which is shown in FIG. 7. This control is performed every predetermined time interval during operation of the electric compressor 102.

In the electric compressor 103 of the third embodiment, in addition to the control which was explained in FIG. 5, control for causing the PWM pulse width check unit 35 to compare the computed values of the drive signals of the electric motor 2 which are input from the control unit 31 and the actual input signals which were input through the branching circuits 23 to the output permission/cutoff control unit 41 is additionally performed. The added control is inserted between step 506 and step 507 of the control routine which was explained at FIG. 5 from part of the control routine of FIG. 3. That is, in the control routine which is shown in FIG. 7, after inversion of the WD pulse is confirmed at step 506 of the control routine which was explained at FIG. 5, step 302 to step 305 of the control routine which was explained at FIG. 3 are performed. When the judgment at step 305 is YES, step 507 is executed, while when the judgment at step 305 is NO, step 701, which comprises the control routine of step 308 plus reset of the count time, is performed.

In this way, in the electric compressor 103 of the third embodiment which is shown in FIG. 6, the following three control routines are possible:

(1) In the same way as the electric compressor 101 of the first embodiment, when, at the time of startup, the ROM/RAM region 33 is in the normal state and the computed results of the top and bottom signals of the UVW phases of the electric motor 2 and the input signals of the output signal control IC 40A are equal, the electric compressor 103 can be made to operate.

(2) In the same way as the electric compressor 102 of the second embodiment, when an ALU error occurs during operation, the operation of the electric compressor 103 can be stopped and the electric compressor 103 then restarted. For this reason, it is possible to prevent in advance the abnormal state of the electric compressor 103 due to erroneous operation of the drive IC 30C.

(3) When the ROM/RAM region 33 becomes abnormal in state during operation or the computed results of the top and bottom signals of the UVW phases of the electric motor 2 and the input signals of the output signal control IC 40A no longer match, it is possible to stop the electric compressor 103 to prevent in advance an abnormal state of the electric compressor 103.

That is, in the electric compressor 103 of the third embodiment, it is possible to confirm by the ALU error check that the processing function is normal and to confirm by the pulse width check that the actual output of the drive IC is normal, so it is possible to start up or continue the operation of the electric compressor even under more severely restricted environments. Specifically, there is an improvement in the startup property in a low temperature environment when using an aluminum electrolytic capacitor for the capacitor 12 of the input filter 10. An aluminum electrolytic capacitor increases in the resistance component when the temperature is low. Even if running the same current, the voltage generated becomes larger. If large drive signals end up mistakenly being output from the drive IC 30B, the switching devices 25 of the switching circuit 20 might malfunction due to application of voltages of more than the withstand voltages to the switching devices 25. For this reason, at a low temperature, control is often adopted to restrict the output of the electric compressor and lift the output restriction when the capacitor warms up due to the heat generated at the time of a drive operation. At this time, if checking the PWM output pulses in advance and output of fine drive signals can be guaranteed, it is possible to start startup of the electric compressor without leading to a malfunction even if starting it up at a low temperature. Accordingly, even if using the same devices as in the past, it becomes possible to drive the electric compressor at a lower temperature.

Figure 10:
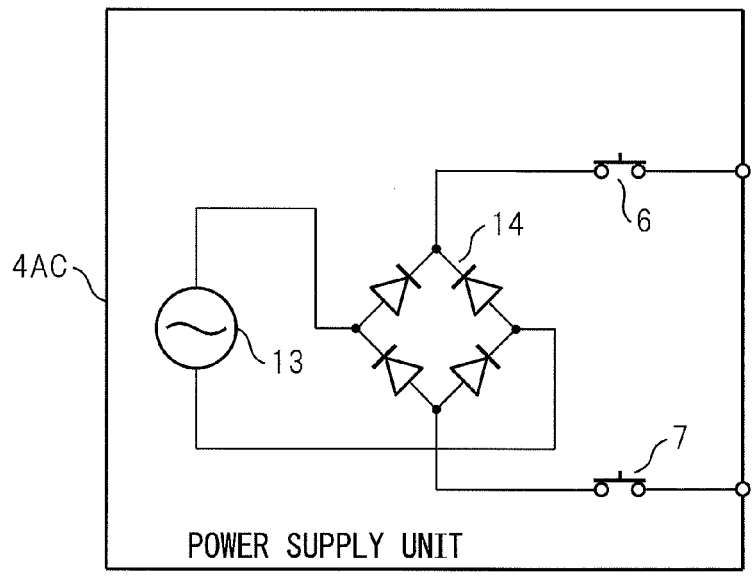
FIG. 10 is a circuit diagram which shows the configuration of another embodiment of a power supply unit which is connected to the inverter device of the present invention.

Note that, in the electric compressors 101 to 103 of the first to third embodiments which were explained above, DC power supply units were used for the power supply units 4 which were connected to the inverter devices 1A to 1C, but instead of a DC power supply unit 4, it is also possible to use an AC power supply unit 4AC such as shown in FIG. 10. In the AC power supply unit 4AC, alternating current from a commercial power supply 13 is converted to direct current by a rectifying circuit 14 using a diode bridge. For the switches 6 and 7, ones the same as the DC power supply unit 4 may be used.

Figure 11:
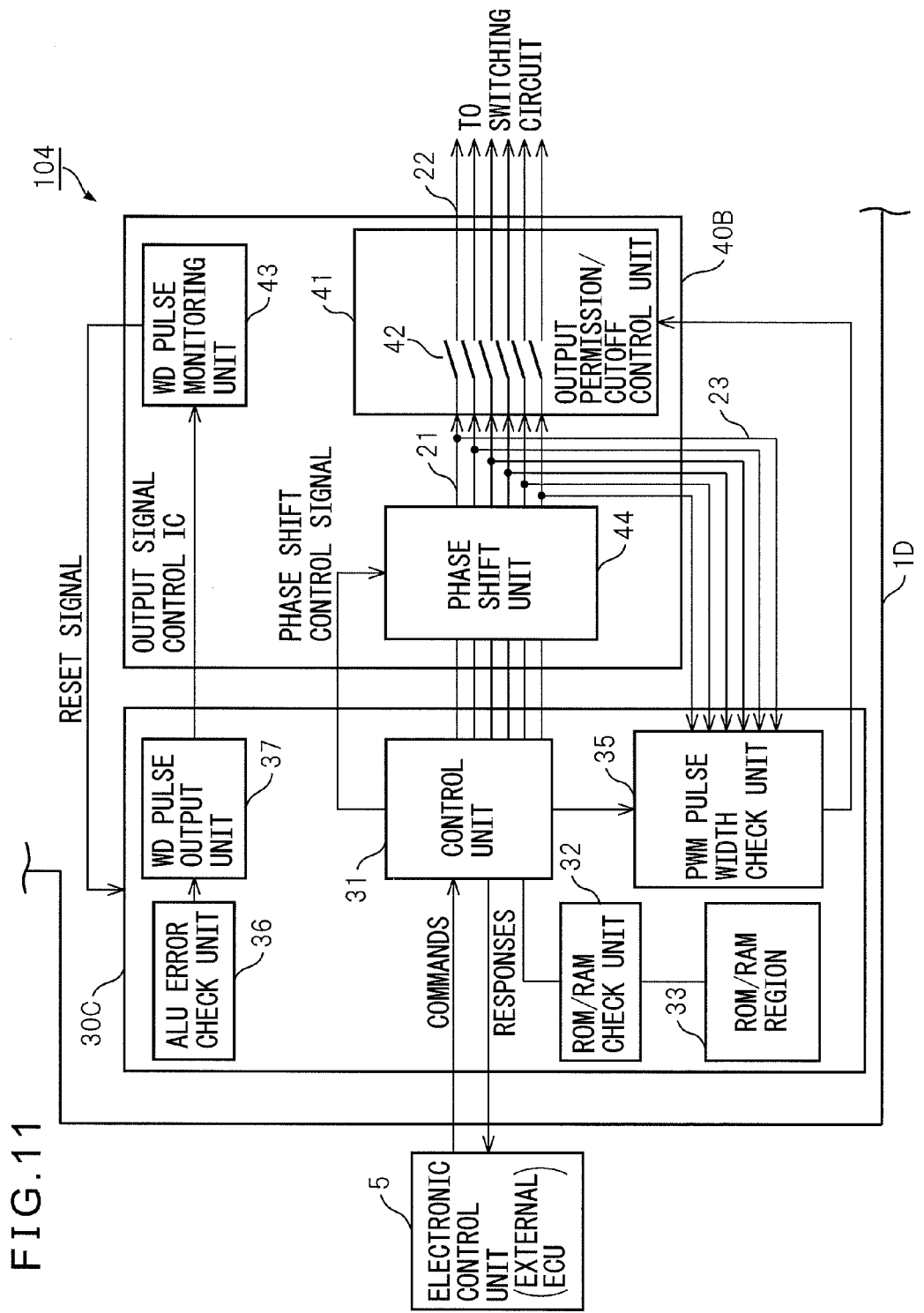
FIG. 11 is a partial block diagram of the configuration which shows the configuration of an electric compressor of a fourth embodiment of the present invention.

FIG. 11 shows the configuration of an electric compressor 104 of a fourth embodiment of the present invention which operates by commands from the external ECU 5. The electric compressor 104 of the fourth embodiment differs from the electric compressor 103 of the third embodiment in the point that a phase shift unit 44 is provided at a stage before the junction of the branching circuit 23 of the first signal transmission circuit 21 which is shown in the third embodiment. Therefore, only the main parts where the electric compressor 104 of the fourth embodiment differs from the electric compressor 103 of the third embodiment are shown in FIG. 11. Further, in the fourth embodiment, the phase shift unit 44 is configured provided inside of the output signal control IC 40B, but the phase shift unit 44 may also be configured provided outside of the output signal control IC 40B.

In the electric compressor 104 of the fourth embodiment, the phase shift control signal from the control unit 31 is input to the phase shift unit 44, then phase shift unit 44 uses the phase shift control signal as the basis to output the control signal shifted in phase. The PWM pulse width check unit 35 compares the drive signal after the phase shift which is input from the branching circuit 23 with the signal obtaining by phase shift of the computed value of the drive signal which is input from the control unit 31. The phase of the drive signal is shifted in this way for improving the controllability. Further, the phase shift may be performed for all of the six drive signals.

Figure 12:
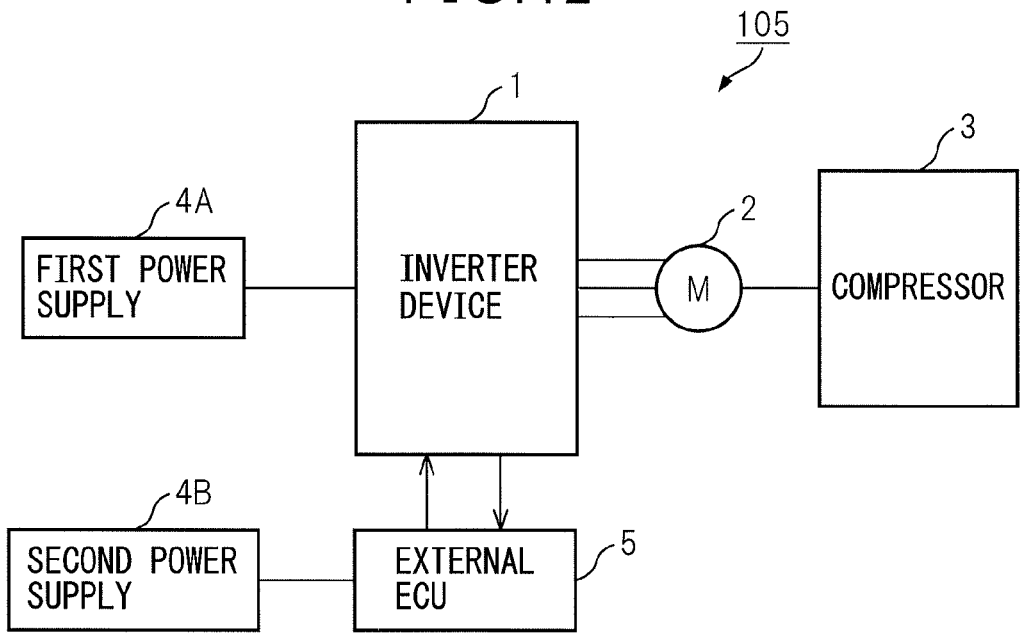
FIG. 12 is a block diagram of the configuration which shows the configuration of an electric compressor of a fifth embodiment of the present invention.

FIG. 12 shows the configuration of an electric compressor 105 of a fifth embodiment of the present invention. In the electric compressor 105 of the fifth embodiment, the inverter device 1 is driven by a first power supply 4A, while the external ECU is driven by a second power supply 4B. Further, the voltage of the first power supply 4A is higher than the voltage of the second power supply 4B. For example, in the case where the electric compressor 105 of the fifth embodiment is mounted in a hybrid vehicle and built into an air-conditioner there, that is, a vehicle-mounted compressor, the voltage of the first power supply 4A is the voltage of a 200 to 300V high voltage battery, while the voltage of the second power supply 4B is the voltage of the 12V car battery.

Figure 13:
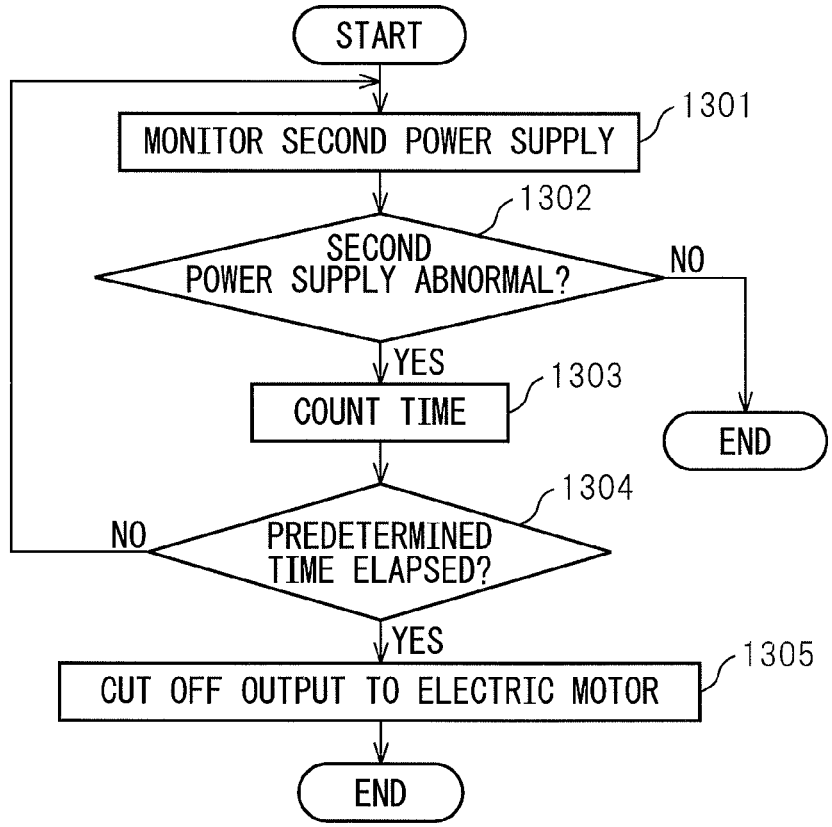
FIG. 13 is a flowchart which shows one example of control during drive of the electric compressor of a fifth embodiment of the present invention.

When an electric compressor 105 of the fifth embodiment is mounted in a hybrid vehicle and built into an air-conditioner there, sometimes the power supply 4B of the external ECU 5 will drop in voltage etc. resulting in the occurrence of an abnormality in the communication with the inverter device 1. In such a case, abnormality of communication is monitored for. If an abnormality occurs, the drive signal to the electric motor 2 is cut off immediately or after the elapse of a predetermined time. An example of the control in this case will be explained using the flowchart which is shown in FIG. 13. This control is executed every predetermined time interval.

At step 1301, the voltage of the second power supply 4B is monitored. At the next step 1302, it is judged if the voltage of the second power supply 4B is abnormal. When the voltage of the power supply 4B is normal (NO), this routine is ended, while when the voltage of the power supply 4B is abnormal (YES), the routine proceeds to step 1303. At step 1303, the time is counted, while at the next step 1304, it is judged if a predetermined time has elapsed. When the predetermined time has not elapsed (NO), the processing from step 1301 to step 1303 is repeated, while when the predetermined time has elapsed (YES), the routine proceeds to step 1305 where the output of the drive signal to the electric motor 2 is cut off. To cut off the output of the drive signal to the electric motor 2, as explained in the above first to fourth embodiments, it is sufficient to send an output cutoff signal to the output permission/cutoff control unit 41.

Furthermore, in the embodiments which were explained above, when runaway operation of the external ECU 5 etc. causes contradictions to be detected in the contents of the commands from the external ECU 5 to the inverter device 1, it is sufficient to send the output permission/cutoff control unit 41 an output cutoff signal to cut off drive signals to the electric motor 2. As a contradiction in the contents of the commands, for example, the case where the air-conditioner is off and, in that state, drive commands are output to the electric motor may be considered.

The invention now being fully described, it will be apparent to one of ordinary skill in the art that many changes and modifications can be made thereto without departing from the spirit or scope of the invention as set forth herein.

It will be understood that the above description of the present invention is susceptible to various modifications, changes, and adaptations, and the same are intended to be comprehended within the meaning and range of equivalents of the appended claims

What is claimed is:

1. An electric compressor comprising:
an electric motor which operates said compressor;
an external control unit which outputs commands for controlling the operation of said electric motor; and
an inverter device which controls the operation of said electric motor which operates said compressor by commands from said external control unit provided with a drive circuit which uses an arithmetic logic unit to compute drive signals to said electric motor from said commands, a switching circuit which converts said drive signals to rotation control signals of said electric motor, and a cutoff circuit which cuts off input of said drive signals to said switching circuit at the time of an abnormality,
said inverter device further comprising:
a logic error detector which detects a logic error of the computed results of said drive signals at said arithmetic logic unit; and
said logic error detector outputs an output cutoff signal to said cutoff circuit to cut off input of said drive signals to said switching circuit when there is a logic error in the computed results of said drive signals at said arithmetic logic unit.

2. An electric compressor as set forth in claim 1, wherein:
said logic error detector is a comparator which is provided at said drive circuit and compares said drive signals which are input to said switching circuit and the computed values of said drive signals at said arithmetic logic unit inside of said drive circuit; and
said comparator outputs an output cutoff signal to said cutoff circuit so as to cut off the input of said drive signals to said switching circuit when said drive signals and said computed values do not match.

3. An electric compressor as set forth in claim 2, wherein:
said comparator outputs an output cutoff signal to said cutoff circuit to cut off input of said drive signals to said switching circuit at the time of startup of said electric compressor,
compares said drive signals and said computed values in that state, and,
when said drive signals and said computed values match, retracts said output cutoff signal.

4. An electric compressor as set forth in claim 3, wherein:
said electric motor is a three-phase AC motor, said drive signals are a U-phase top arm drive signal, U-phase bottom arm drive signal, V-phase top arm drive signal, V-phase bottom arm drive signal, W-phase top arm drive signal, and W-phase bottom arm drive signal and in that said comparator outputs an output cutoff signal to said cutoff circuit to cut off input of said drive signals to said switching circuit when at least one drive signal among these drive signals does not match with a corresponding computed value.

5. An electric compressor as set forth in claim 3, wherein:
the compressor is provided with a phase shift unit which shifts a phase of said drive signals to said cutoff circuit and
said comparator outputs an output cutoff signal to said cutoff circuit to cut off input of said drive signals to said switching circuit when said drive signals after the phase shift and the computed values after phase shift of said computed values do not match.

6. An electric compressor as set forth in claim 2, wherein:
said electric motor is a three-phase AC motor, said drive signals are a U-phase top arm drive signal, U-phase bottom arm drive signal, V-phase top arm drive signal, V-phase bottom arm drive signal, W-phase top arm drive signal, and W-phase bottom arm drive signal and in that said comparator outputs an output cutoff signal to said cutoff circuit to cut off input of said drive signals to said switching circuit when at least one drive signal among these drive signals does not match with a corresponding computed value.

7. An electric compressor as set forth in claim 6, wherein:
the compressor is provided with a phase shift unit which shifts a phase of said drive signals to said cutoff circuit and
said comparator outputs an output cutoff signal to said cutoff circuit to cut off input of said drive signals to said switching circuit when said drive signals after the phase shift and the computed values after phase shift of said computed values do not match.

8. An electric compressor as set forth in claim 2, wherein:
the compressor is provided with a phase shift unit which shifts a phase of said drive signals to said cutoff circuit and
said comparator outputs an output cutoff signal to said cutoff circuit to cut off input of said drive signals to said switching circuit when said drive signals after the phase shift and the computed values after phase shift of said computed values do not match.

9. An electric compressor as set forth in claim 1, wherein:
said logic error detector is comprising:
an error check unit which outputs an error signal when there is an error in the arithmetic logic unit in said drive circuit and a monitoring pulse output unit which makes the output of the monitoring pulse invert every predetermined time interval when said error signal is not input, both provided in said drive circuit; and
an inversion detector which is provided in said cutoff circuit and which detects inversion of the monitoring pulse which is output from said monitoring pulse output unit,
said inversion detector cuts off input of said drive signals from said cutoff circuit to said switching circuit when inversion of said monitoring pulse is not detected within a prescribed time.

10. An electric compressor as set forth in claim 9, wherein:
said inversion detector outputs a reset signal to said arithmetic logic unit to reset the arithmetic logic unit when cutting off input of said drive signals to said switching circuit.

11. An electric compressor as set forth in claim 10, wherein said error check unit compares commands which are input from said external control unit and drive signals from said arithmetic logic unit and outputs said error signal when there is a contradiction in the contents of said commands and said drive signals.

12. An electric compressor as set forth in claim 9, wherein said error check unit compares commands which are input from said external control unit and drive signals from said arithmetic logic unit and outputs said error signal when there is a contradiction in the contents of said commands and said drive signals.

13. An electric compressor as set forth in claim 1, wherein:
said logic error detector is comprising:
a comparator which is provided in said drive circuit and which compares said drive signals which are input to said switching circuit and computed values of said drive signals at the arithmetic logic unit in said drive circuit;
an error check unit which outputs an error signal when there is an error in the arithmetic logic unit in said drive circuit and a monitoring pulse output unit which makes an output of the monitoring pulse invert every predetermined time interval when said error signal is not input, both of which are provided in said drive circuit; and an inversion detector which is provided at said cutoff circuit and which detects inversion of the monitoring pulse which is output from said monitoring pulse output unit, said comparator outputs an output cutoff signal to said cutoff circuit to cut off input of said drive signals to said switching circuit when said drive signals and said computed values do not match, and the inversion detector cuts off input of said drive signals from said cutoff circuit to said switching circuit when inversion of said monitoring pulse is not detected within a prescribed time.

14. An electric compressor as set forth in claim 13, wherein:

said comparator outputs an output cutoff signal to said cutoff circuit to cut off input of said drive signals to said switching circuit at the time of startup of said electric compressor, compares said drive signals and said computed values in that state, and, when said drive signals and said computed values match, retracts said output cutoff signal.

15. An electric compressor as set forth in claim 13, wherein:

said inversion detector outputs a reset signal to said arithmetic logic unit to reset the arithmetic logic unit when cutting off input of said drive signals to said switching circuit.

16. An electric compressor as set forth in claim 13, wherein:

said electric motor is a three-phase AC motor, said drive signals are a U-phase top arm drive signal, U-phase bottom arm drive signal, V-phase top arm drive signal, V-phase bottom arm drive signal, W-phase top arm drive signal, and W-phase bottom arm drive signal and in that said comparator outputs an output cutoff signal to said cutoff circuit to cut off input of said drive signals to said switching circuit when at least one drive signal among these drive signals does not match with a corresponding computed value.

17. An electric compressor as set forth in claim 13, wherein:

the compressor is provided with a phase shift unit which shifts a phase of said drive signals to said cutoff circuit and said comparator outputs an output cutoff signal to said cutoff circuit to cut off input of said drive signals to said switching circuit when said drive signals after the phase shift and the computed values after phase shift of said computed values do not match.

18. An electric compressor as set forth in claim 13, wherein said error check unit compares commands which are input from said external control unit and drive signals from said arithmetic logic unit and outputs said error signal when there is a contradiction in the contents of said commands and said drive signals.

19. An electric compressor as set forth in claim 1, wherein: a power supply device which supplies power to said inverter device is any one of a car battery or power supply device which supplies direct current obtained by rectification of a commercial power supply.

20. An electric compressor as set forth in claim 1, wherein said electric compressor is an electric compressor which is mounted in a hybrid vehicle, said external control unit is connected to a car battery, and said inverter device is connected to a high voltage battery which is mounted in said hybrid vehicle.

* * * * *